3,202,474
PROCESS FOR CROSSLINKING CELLULOSE WITH
FORMALDEHYDE ADDUCTS OF DIVINYL
SULFONE
Clark M. Welch, New Orleans, La., assignor to the United
States of America as represented by the Secretary of
Agriculture
No Drawing. Filed Jan. 23, 1962, Ser. No. 168,288
4 Claims. (Cl. 8—120)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to the preparation of novel addition products of divinyl sulfone with formaldehyde, and the application of such products to cellulose to produce novel crosslinked and partially etherified cellulose. An object of the invention is to prepare cellulosic materials, particularly cellulosic textiles, having durable wrinkle resistance and increased resistance to shrinkage and stretching. A second object is to provide a method of treating cellulosic textiles in which method the odor and inhalation toxicity problems associated with the use of free divinyl sulfone are eliminated. Other objects will be apparent from the description which follows.

It is well known that formaldehyde in aqueous solution exists as a series of hydrates of the structure $HO(CH_2O)_nH$ where $n$ is in the range 1–3 for most of the solute (J. F. Walker, "Formaldehyde," Reinhold Publishing Corporation, 1953, pp. 47–55). In the hydrate form, formaldehyde is a weak acid and reacts with alkalies to form salts (Walker, p. 178–9) which may serve as intermediates in a number of reactions. In the present invention it is shown that excess aqueous formaldehyde reacts with divinyl sulfone in the presence of alkaline catalysts, denoted by X, in the following manner:

$$HO(CH_2O)_nH + CH_2=CHSO_2CH=CH_2 \xrightarrow{X}$$
$$HO(CH_2O)_n-CH_2CH_2SO_2CH=CH_2$$

$$2HO(CH_2O)_nH + CH_2=CHSO_2CH=CH_2 \xrightarrow{X}$$

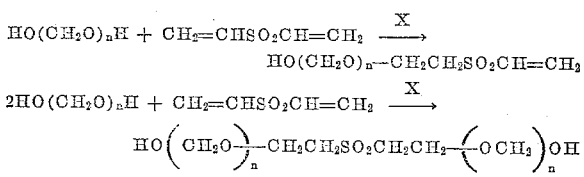

Highly water-soluble adducts are formed when the mole ratio of formaldehyde/divinyl sulfone used is in the range 0.9 to 10.0. When the mole ratio is in the range 0.2 to 0.9, the following reaction occurs:

$$HO(CH_2O)_nH + 2CH_2=CHSO_2CH=CH_2 \longrightarrow$$

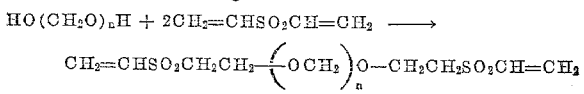

The adducts formed in this reaction are but slightly soluble in water. All the adducts obtained in these reactions are found to be reactive toward cellulose and are useful in introducing crosslinks. Solutions of the water-soluble types of adducts may be freed of any divinyl sulfone odor by extraction of traces of unreacted divinyl sulfone with a water-immiscible inert solvent such as benzene. The sparingly water-soluble type of adduct may be freed of divinyl sulfone odor by extraction of any unreacted divinyl sulfone with water.

Catalysts suitable for preparation of these adducts are soluble bases such as alkali metal hydroxides and carbonates, alkaline earth metal hydroxides, organic quaternary ammonium hydroxides and carbonates, and tertiary aliphatic amines. Bases considerably stronger than alkali metal carbonates have the disadvantage, however, of accelerating even at moderate temperatures the reaction of divinyl sulfone with water which may be present, thus decreasing the yield of the formaldehyde-divinyl sulfone adducts.

The reaction of formaldehyde and divinyl sulfone is advantageously carried out in solution and preferably in aqueous solution, using catalyst concentrations below 5%, and temperatures of 20–100° C. The rate of reaction will vary with the particular catalyst present and its concentration, as well as the concentrations of formaldehyde and divinyl sulfone. At low catalyst concentrations, warming is required to initiate the reaction. However, the reaction is exothermic once it is initiated, and proceeds quite rapidly at temperatures below those required for reaction of divinyl sulfone with water.

The application of the highly water-soluble type of adduct to cellulose is simple and rapid. The solution obtained in preparing the adduct is diluted to the strength desired, an alkaline catalyst is added if that already present is too dilute, and the solution is applied to cellulose in the form of fiber, yarn, or fabric. The cellulose is then kept for 0.5–30 minutes at temperatures ranging from 20–170° C., the optimum temperature depending upon the type and concentration of catalyst used. Catalysts suitable for the application of the adducts to cellulose are alkali metal hydroxides, carbonates and bicarbonates, alkaline earth metal hydroxides and organic quaternary ammonium hydroxides, carbonates and bicarbonates. Although catalyst concentrations of 0.1–30% may be used, concentrations of 1–3% are preferred when curing at 120–160° C., and under these conditions, curing is complete in 0.5–5 minutes.

The application to cellulose of the sparingly water-soluble type of adduct described above may be carried out by dissolving the adduct in an inert water-miscible volatile organic solvent and diluting the latter with water to the desired concentration, followed by addition of catalyst and curing as with the highly water-soluble types of adducts.

A further variation in the process of this invention is the application to cellulose of a mixture of divinyl sulfone, formaldehyde, and an alkaline catalyst in an inert volatile solvent such as water, followed by curing in the manner described for the preformed adducts. The catalyst concentration is kept at or below 3% so that the formaldehyde and divinyl sulfone do not react at room temperature. The catalysts suitable for this method are the same as those used in applying the preformed adducts to cellulose. While this variation has the disadvantage that the treating solution retains the irritating and lachrymatory odor of divinyl sulfone, it resembles the other methods in giving a higher efficiency of reaction with cellulose than is obtained in the absence of the formaldehyde.

The formation of crosslinks in cellulosic materials treated by the processes of this invention is evidenced not only by enhanced wrinkle resistance and other forms of dimensional stability, but also by insolubility of the treated fibers in cuprammonium hydroxide or cupriethylenediamine solution. While it is believed that the adducts, particularly those of sparingly water-soluble type, are capable of acting directly as crosslinking agents, it is also possible that the adducts undergo partial dissociation under the curing conditions used, to generate appreciable amounts of divinyl sulfone in situ. This sulfone also is a highly effective crosslinking agent.

An unexpected feature of cellulosic fabrics treated by the processes of this invention is the fact that both their tensile strength and their wrinkle resistance in the wet state can be further increased by subsequent mercerization with aqueous sodium hydroxide or potassium hydroxide at concentrations of 17–35%. The great durability of the finishes described herein is also demonstrated by the fact that they withstand treatment with such strong alkalies.

which they were again washed, dried and equilibrated. The properties of the treated fabrics were as follows:

| Run No. | Cure Temp. | Weight Gain | Percent Sulfur | Crease Recovery, degrees | | Strength [1] Loss, Percent |
|---|---|---|---|---|---|---|
| | | | | Wet | Dry | |
| (1) | 135° C | 10% | 1.73 | 241 | 226 | 42 |
| (2) | 145° C | 13% | 2.10 | 255 | 246 | 44 |
| (3) | Run (1) aftermercerized | | 1.31 | 297 | 175 | 25 |
| (4) | Run (2) aftermercerized | | 1.64 | 291 | 196 | 30 |
| (5) | Untreated fabric | | | 160 | 157 | |

[1] Compared at constant thread count.

The following examples illustrate the preparation and application to cellulose of adducts formed by divinyl sulfone with formaldehyde at varying mole ratios of the two reactants. Crease recovery angles cited are double the values measured in the warp direction by the Monsanto crease recovery test. The adaptation of Lawrence and Phillips, Am. Dyestuff Reptr., 45, p. 548 (1956), was used for crease recovery tests in the wet state. A Scott tester was used for warp breaking strength determinations. The fabric used was desized, scoured and bleached 80×80 cotton print cloth.

*Example 1*

A solution of formaldehyde-divinyl sulfone adduct (highly soluble type) was prepared as follows: to 10 ml. (0.1 mole) of divinyl sulfone in 25 ml. of water was added 15 ml. of 40% aqueous formaldehyde (0.2 mole) and 1.0 g. of sodium carbonate monohydrate. The mixture was warmed to 40° C. with stirring. A mildly exothermic reaction began and the temperature gradually rose to 50° C. even though heating had been removed. After 15 minutes longer, the temperature began to fall. The mixture was kept at 50° for 15 minutes more and then allowed to stand for one hour. It was shaken with three 20 ml. portions of benzene to remove traces of divinyl sulfone. There was obtained 44 ml. of adduct solution having a concentration of about 25%.

In a control experiment in which 10 ml. of divinyl sulfone was heated with 40 ml. of water and 1 g. of sodium carbonate monohydrate in the absence of formaldehyde, no reaction occurred until the temperature was raised to 90°, whereupon an insoluble polymer separated. This shows that the reaction of divinyl sulfone with formaldehyde leads to a different adduct than does the reaction of divinyl sulfone with water.

*Example 2*

The adduct solution of Example 1 was applied to print cloth in the following way: the solution, which already contained sufficient sodium carbonate to serve as a catalyst, was applied in one dip and one nip to the fabric, the pressure of the wringer rolls being adjusted to give a wet pickup of 125%. The fabric was oven-cured at a specified temperature for 5 minutes. It was washed thoroughly in both cold and hot water, heat-dried and air equilibrated to constant moisture content. Samples of the treated fabric were subsequently mercerized by being soaked in 20% sodium hydroxide for 5 minutes, after

*Example 3*

The adduct preparation of Example 1 was repeated using 10 ml. (0.1 mole) of divinyl sulfone, 7.6 ml. (0.1 mole) of 40% formaldehyde, 30 ml. of water and 1.00 g. of sodium carbonate monohydrate. The exothermic reaction was carried out at 40–55° C. as before. After the usual benzene extractions, there was obtained 43 ml. of a solution containing about 25% by weight of adduct.

*Example 4*

The adduct solution of Example 3 was diluted with three volumes of water, and based on the total solution, 1.85% by weight of sodium bicarbonate was added. The solution was applied to print cloth in one dip and one nip to a wet pickup of 113%. The fabric was oven-cured at 135° C. for 5 minutes. It was washed, heat-dried and air-equilibrated. The treated cloth showed a gain in weight of 5%, a sulfur content of 0.80%, a crease recovery angle of 283° wet and 255° dry, and a breaking strength loss of 45%. Untreated fabric showed crease recovery angles of 160° wet and 157° dry.

*Example 5*

The adduct preparation of Example 1 was repeated using 10 ml. (0.1 mole) of divinyl sulfone, 5.7 ml. (0.075 mole) of 40% formaldehyde, 30 ml. of water and 1.00 g. of sodium carbonate monohydrate. The exothermic reaction was carried out at 45–55° C., as before. The reaction mixture was shaken with 20 ml. of benzene, causing three liquid layers to form. The two denser layers were added to 30 ml. of water and 0.35 ml. of glacial acetic acid, bringing the pH to 8. Then 1.35 g. of sodium bicarbonate and 20 ml. of tetrahydrofuran were added, giving 90 ml. of a homogeneous solution containing the adduct in a concentration of about 15%.

Evaporation of the benzene extract gave only 0.3 g. of divinyl sulfone, showing practically all of the divinyl sulfone had reacted with formaldehyde.

*Example 6*

The adduct solution of Example 5 was diluted to a specified strength, and a specified amount of extra sodium bicarbonate was added to compensate for dilution of catalyst already present. The solution was then applied to print cloth in one dip and one nip to a wet pickup of 113–118%, and the cloth was cured at 135° C. for 5 minutes. The cloth was subsequently washed, oven-dried, and air-equilibrated. The fabric properties were as follows:

| Adduct Concentration | Extra NaHCO$_3$, Percent | Weight Gain, Percent | Percent Sulfur | Crease Recovery, Degrees | | Strength [1] Loss, Percent |
|---|---|---|---|---|---|---|
| | | | | Wet | Dry | |
| 15% | 0.0 | 8.4 | 1.34 | 269 | 231 | 36 |
| 7.5 | 1.0 | 5.2 | 0.88 | 250 | 242 | 37 |
| Untreated fabric | | | | 160 | 157 | 0 |

[1] Compared at constant thread count.

Example 7

The adduct preparation of Example 1 was repeated using 10 ml. (0.1 mole) of divinyl sulfone, 3.8 ml. (0.05 mole) of 40% formaldehyde, 30 ml. of water and 1.00 g. of sodium carbonate monohydrate. The exothermic reaction was carried out at 40–50° C. in the usual way. Two liquid phases separated. The addition of 20 ml. of tetrahydrofuran and 30 ml. of water gave 90 ml. of homogeneous solution containing the adduct in a concentration of about 12%.

Example 8

To the adduct solution of Example 7 was added 8% by volume of tetrahydrofuran and 1% by weight of sodium carbonate. The solution was applied to print cloth in one dip and one nip to a wet pickup of 112%, and the cloth was cured at 135° C. for 5 minutes. The cloth was subsequently washed, oven-dried and air-equilibrated. The fabric properties were as follows: weight gain—8%, sulfur content—1.21%, wet crease recovery—278°, dry crease recovery—241°, breaking strength loss—40%. Untreated fabric showed crease recovery angles of 160° wet and 157° dry.

Example 9

Print cloth was soaked in a solution containing 5 ml. (0.06 mole) of 36% aqueous formaldehyde, 2.0 ml. (0.02 mole) of divinyl sulfone and 0.25 g. of sodium carbonate in 15 ml. of water at room temperature. The fabric was then oven-cured at 135° C. for 10 minutes, and was subsequently washed, dried and air-equilibrated. It showed a weight increase of 10% and had high wrinkle resistance in both the wet and dry states.

The same experiment carried out in the absence of formaldehyde gave fabric having a weight increase of 6%. The experiment conducted with formaldehyde present but divinyl sulfone absent gave a weight increase of only 0.9%.

I claim:

1. A process for crosslinking cellulose which comprises wetting the cellulose with a solution in an inert volatile solvent of an alkaline catalyst together with an addition product previously formed by the base-catalyzed reaction of formaldehyde with divinyl sulfone, the wetted cellulose subsequently being kept at 20–170° C. for from 0.5 to 30 minutes, resulting in a treated cellulose which in the form of fabric exhibits increased wrinkle resistance and enhanced dimensional stability.

2. The process of claim 1 wherein the crosslinked cellulose is aftermercerized.

3. A process for crosslinking cellulose which comprises wetting the cellulose with a solution of formaldehyde, divinyl sulfone and an alkaline catalyst in an inert, volatile solvent, the wetted cellulose subsequently being kept at 20–170° C. for from 0.5 to 30 minutes, resulting in a treated cellulose which in the form of fabric exhibits increased wrinkle resistance and enhanced dimensional stability, and also resulting in a greater reaction efficiency than would otherwise be obtained without the presence of formaldehyde.

4. The process of claim 3 wherein the crosslinked cellulose is aftermercerized.

References Cited by the Examiner

UNITED STATES PATENTS

| | | | |
|---|---|---|---|
| 2,470,077 | 5/49 | Fincke | 260—607 |
| 2,524,399 | 10/50 | Schoene et al. | 8—116 |
| 2,573,580 | 10/51 | Ladd | 260—607 |
| 2,878,294 | 3/59 | Kress. | |
| 2,988,417 | 6/61 | Emmons | 8—116 |
| 3,068,123 | 12/62 | Feldmann. | |

OTHER REFERENCES

Reinhardt et al.: American Dyestuff Reporter, vol. 47, pp. 758–764 (1958).

Tripp et al.: Textile Research Journal, vol. 28, pp. 404–417 (1958).

Welch et al.: Textile Research Journal, vol. 31, pp. 84–86 (1961).

NORMAN G. TORCHIN, *Primary Examiner.*

ABRAHAM H. WINKELSTEIN, *Examiner.*